(12) United States Patent
Woodall

(10) Patent No.: US 7,605,867 B1
(45) Date of Patent: Oct. 20, 2009

(54) METHOD AND APPARATUS FOR CORRECTION OF TIME BASE ERRORS

(75) Inventor: Neil Woodall, Newport Beach, CA (US)

(73) Assignee: Pixelworks, Inc., Tualatin, OR (US)

( * ) Notice: Subject to any disclaimer, the term of this patent is extended or adjusted under 35 U.S.C. 154(b) by 420 days.

(21) Appl. No.: 10/833,640

(22) Filed: Apr. 27, 2004

Related U.S. Application Data

(60) Provisional application No. 60/472,312, filed on May 20, 2003.

(51) Int. Cl.
H04N 9/89 (2006.01)

(52) U.S. Cl. ..................................... 348/512

(58) Field of Classification Search .............. 348/207, 348/500, 513, 536–537, 544, 540, 510, 512
See application file for complete search history.

(56) References Cited

U.S. PATENT DOCUMENTS

| | | | |
|---|---|---|---|
| 3,860,952 A * | 1/1975 | Tallent et al. ............... 348/498 |
| 4,196,445 A * | 4/1980 | Okada et al. ............... 348/499 |
| 4,443,821 A | 4/1984 | Kato |
| 4,641,180 A | 2/1987 | Richter |
| 4,675,724 A | 6/1987 | Wagner |
| 4,855,815 A | 8/1989 | Yasuki et al. |
| 5,097,321 A | 3/1992 | Stern et al. |
| 5,121,203 A | 6/1992 | Citta |
| 5,121,207 A | 6/1992 | Herrmann |
| 5,134,467 A | 7/1992 | Kim |
| 5,142,377 A * | 8/1992 | Moriyama et al. ............. 386/2 |
| 5,166,792 A * | 11/1992 | Lyon .......................... 348/441 |
| 5,231,478 A | 7/1993 | Fairhurst |
| 5,260,839 A | 11/1993 | Matsuta et al. |
| 5,345,276 A | 9/1994 | Hong |
| 5,355,176 A | 10/1994 | Inagaki et al. |
| 5,359,366 A | 10/1994 | Ubukata et al. |
| 5,367,338 A | 11/1994 | Rothermel et al. |
| 5,394,193 A | 2/1995 | Kim |
| 5,418,818 A | 5/1995 | Marchetto et al. |
| 5,506,932 A | 4/1996 | Holmes et al. |
| 5,525,984 A | 6/1996 | Bunker |
| 5,526,129 A * | 6/1996 | Ko ............................. 386/16 |
| 5,600,379 A | 2/1997 | Wagner |
| 5,686,972 A | 11/1997 | Kim |
| 5,710,729 A | 1/1998 | Feste et al. |
| 5,748,842 A | 5/1998 | Holmes et al. |
| 5,909,255 A | 6/1999 | Hatano |

(Continued)

FOREIGN PATENT DOCUMENTS

EP 0449501 A 10/1991

(Continued)

*Primary Examiner*—Paulos M Natnael
(74) *Attorney, Agent, or Firm*—Marger Johnson & McCollom, P.C.

(57) ABSTRACT

The present invention provides a method and apparatus for the correction of time base errors in a video signal. The method and apparatus may combine a horizontal scaler and a time base corrector. A time base corrector in accordance with the present invention can function without locking a clock to a horizontal synchronization signal. Furthermore, a method or apparatus in accordance with the present invention may operate as a finite impulse response filter, an infinite impulse response filter, a low pass filter or an adaptive filter.

29 Claims, 4 Drawing Sheets

U.S. PATENT DOCUMENTS

| | | |
|---|---|---|
| 5,940,138 A | 8/1999 | Lowe |
| 5,953,071 A * | 9/1999 | Van Zon .................... 348/544 |
| 5,963,268 A | 10/1999 | Ko |
| 5,990,978 A | 11/1999 | Kim et al. |
| 6,052,748 A | 4/2000 | Suominen et al. |
| 6,173,003 B1 | 1/2001 | Whikehart et al. |
| 6,175,389 B1 | 1/2001 | Felts, III et al. |
| 6,208,671 B1 | 3/2001 | Paulos et al. |
| 6,297,849 B1 * | 10/2001 | Stessen et al. .............. 348/500 |
| 6,300,985 B1 | 10/2001 | Lowe |
| 6,462,790 B1 | 10/2002 | Lowe et al. |
| 6,581,164 B1 | 6/2003 | Felts, III et al. |
| 6,614,474 B1 * | 9/2003 | Malkin et al. ............... 348/252 |
| 6,714,717 B1 * | 3/2004 | Lowe et al. ................... 386/13 |
| 6,744,472 B1 * | 6/2004 | MacInnis et al. ............ 348/441 |
| 6,774,954 B1 | 8/2004 | Lee |
| 6,795,001 B2 | 9/2004 | Roza |
| 6,795,126 B1 | 9/2004 | Lee |
| 6,804,697 B2 | 10/2004 | Bugeja et al. |
| 6,956,620 B2 | 10/2005 | Na |
| 7,061,509 B2 * | 6/2006 | Dischert et al. ............. 345/629 |
| 7,102,692 B1 * | 9/2006 | Carlsgaard et al. .......... 348/572 |
| 7,139,036 B2 * | 11/2006 | Wang et al. ................. 348/625 |
| 7,180,491 B1 * | 2/2007 | Moore et al. ................... 345/89 |
| 2004/0114054 A1 * | 6/2004 | Mansfield et al. ........... 348/700 |

FOREIGN PATENT DOCUMENTS

| | | |
|---|---|---|
| EP | 0549375 A | 6/1993 |

\* cited by examiner

METHOD AND APPARATUS FOR CORRECTION OF TIME BASE ERRORS

This application claims priority from U.S. Provisional Application No. 60/472,312, filed May 20, 2003, which we incorporate by reference.

INVENTION FIELD

The present invention relates generally to video signal processing, and particularly to time base correction (TBC) for reconstructing a stable video image from an unstable or noisy signal.

BACKGROUND

Video signals may comprise color, brightness and synchronization information. To display stable video images, a device extracts synchronization information from video signals for proper alignment of the video information, namely, to control image raster scanning. Unfortunately, the synchronization information itself may become corrupt and require correction. For example, video tape recorders (VTR) may generate synchronization errors in video signals that often require TBC.

Traditionally, a digital video system using composite or s-video (separate luma and chroma signals) may implement TBC before or after video signal color demodulation. For TBC after color demodulation, two common methods exist. The first method involves a feedback loop that uses the input and output horizontal synchronization signals (e.g., U.S. Pat. No. 5,600,379 to Wagner). The second method relies only on the horizontal synchronization signal measurements made before decoding (e.g., U.S. Pat. No. 6,300,985 to Lowe). Either method ensures a constant number of samples per line.

With consumer televisions, a phase lock loop (PLL) typically aligns the raster scan signal with the horizontal synchronization associated with the input signal. Additionally the PLL may be a low pass filter (LPF). With appropriate time constants the PLL stabilizes display of images with varying line lengths, often called time base errors (TBE). Most TBE arise from the mechanical playback system of video tape recorders, but can also arise from measurement errors in the display device caused by noise.

VTRs produce three distinct types of TBE. A first type results from uneven friction in ball bearings. The uneven friction stretches the tape and causes small variations in line lengths. A second type of error may generate a much larger variation in line length once per field when the VTR playback/record head goes on or off the tape. Trick modes, such as fast-forward, reverse, and pause, cause a third type of error with an incorrect number of lines per field.

VTRs may use a heterodyning process to produce a stable color signal by demodulating and remodulating the color signal with a more stable clock. The process loses the timing relationship between horizontal synchronization signals and the color subcarrier. Analog televisions overcome this problem by demodulating the color signal with a different frequency than the raster scan. In digital decoders, however, using multiple clocks and analog to digital converters (ADC) is cost prohibitive. One clock frequency, therefore, digitizes the signal. That clock frequency locks to either the horizontal synchronization signal or the color burst signal.

When the clock locks to the horizontal synchronization signal, time base correction is automatic. The clock frequency varies to track the horizontal synchronization signals. This variation, however, is difficult to track using a crystal based oscillator, and therefore requires other oscillators with significantly higher jitter. While the increase in jitter is acceptable for vertically aligning the picture, it causes additional color noise.

A device clock may lock to the color burst reference signal, allowing use of a crystal oscillator. The advantage of locking a clock to the color burst is much lower jitter, which reduces color noise. For heterodyne process signals, however, this results in significant time base errors in the decoder output. Use of either synchronization information before decoding or of a feedback loop (e.g., Wagner) may alleviate TBE.

The feedback loop method uses a circuit after decoding to mimic a typical consumer television PLL. Numerous feedback loops are possible. For example, a device could convert the demodulated signal to an analog signal, then convert it back to a digital signal using a clock locked to the analog horizontal synchronization signal. Another possible feedback loop is to do the same process in the digital domain (e.g., Wagner) by replacing the ADC and digital to analog converter (DAC) with a polyphase filter, or other interpolation algorithms, and also replace the analog phase lock loop with its digital equivalent. Either case finds the desired display rate by resampling the output. This method differs from the decoder method that locks to the horizontal synchronization signal because it first demodulates the color information.

Feedback, however, only corrects errors on subsequent lines, resulting in quality equivalent to that of a typical television. Furthermore, the feedback loop requires equality between the TBC output horizontal scan frequency and the input, thereby eliminating the approach in integrated DTV products that merge the final output scaling and the TBC scaling.

Using the synchronization information before decoding involves a feed-forward approach to resample the data based on the input. This implementation is non-trivial. The prior art using this approach eliminates TBE over single lines. By eliminating the errors over a single line, any noise measurement directly translates into horizontal image jitter. It is an object of the present invention to obviate and mitigate at least some of the above-mentioned disadvantages.

SUMMARY OF THE INVENTION

The present invention provides a circuit for video signal processing. The circuit corrects time base errors for reconstructing a stable video image from an unstable or noisy signal.

In one embodiment, the video signal processing circuit comprises a scaler and a time base filter connected with the scaler. The time base filter may convert a video signal to a constant number of vertically aligned samples per line. The time base filter may function without locking a clock to a horizontal synchronization signal.

In another embodiment, a method is disclosed comprising determining a line length for an input signal, and filtering the input signal responsive to the determination. The filtering the input signal may be a function of a phase error. Furthermore, a method or apparatus in accordance with the present invention may operate as a finite impulse response filter, an infinite impulse response filter, a low pass filter or an adaptive filter.

BRIEF DRAWINGS DESCRIPTION

We now describe embodiments of the present invention by way of example only with reference to the following drawings.

DETAILED DESCRIPTION

Figure 1A:
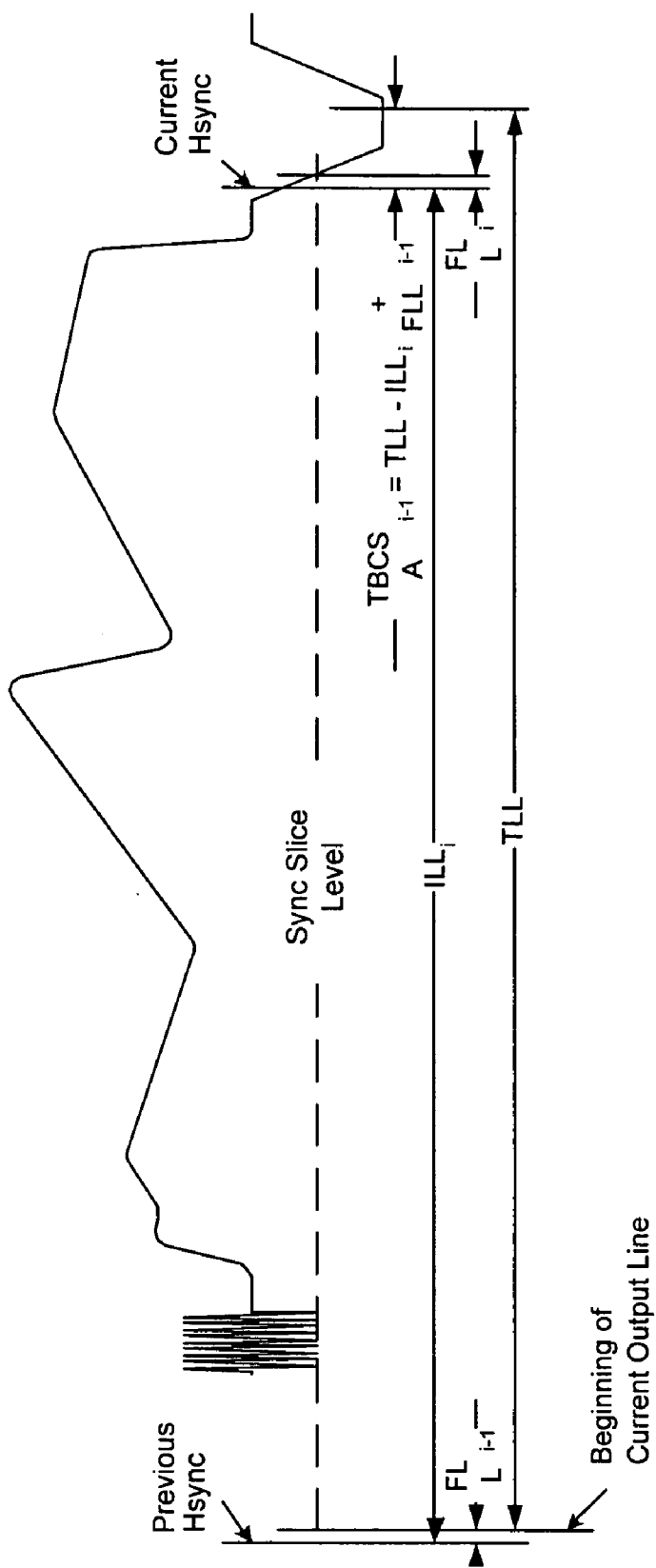
FIG. 1A illustrates timing measurements on a video line spanning subsequent horizontal synchronization (hsync) signals.

For convenience, like numerals in the description refer to like structures in the drawings. The invention we describe provides a method and apparatus that can be used for time base correction (TBC) for reconstructing a stable video image from an unstable or noisy signal.

Figure 2:
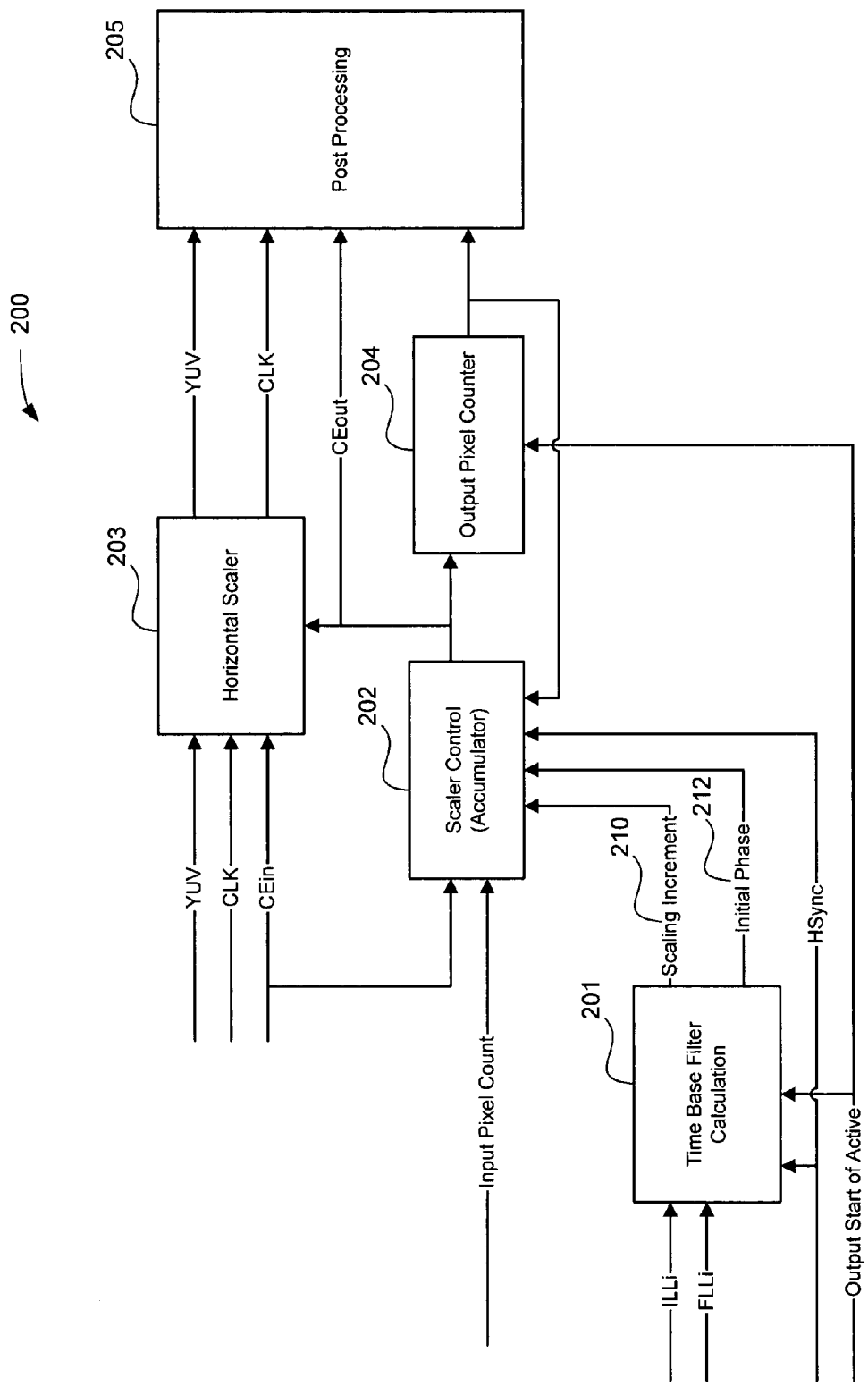
FIG. 2 is a diagram of an embodiment device in accordance with the present invention.

FIG. 2 illustrates a block diagram of a time base correction circuit 200 in accordance with an embodiment of the present invention. The circuit includes a time base filter calculation block 201, a scaler control (accumulator) 202, a horizontal scaler 203, and an output pixel counter 204. Some embodiments may include an additional post-processing block 205. The calculations for each portion of the circuit 200 are shown in detailed equations later.

Figure 1B:
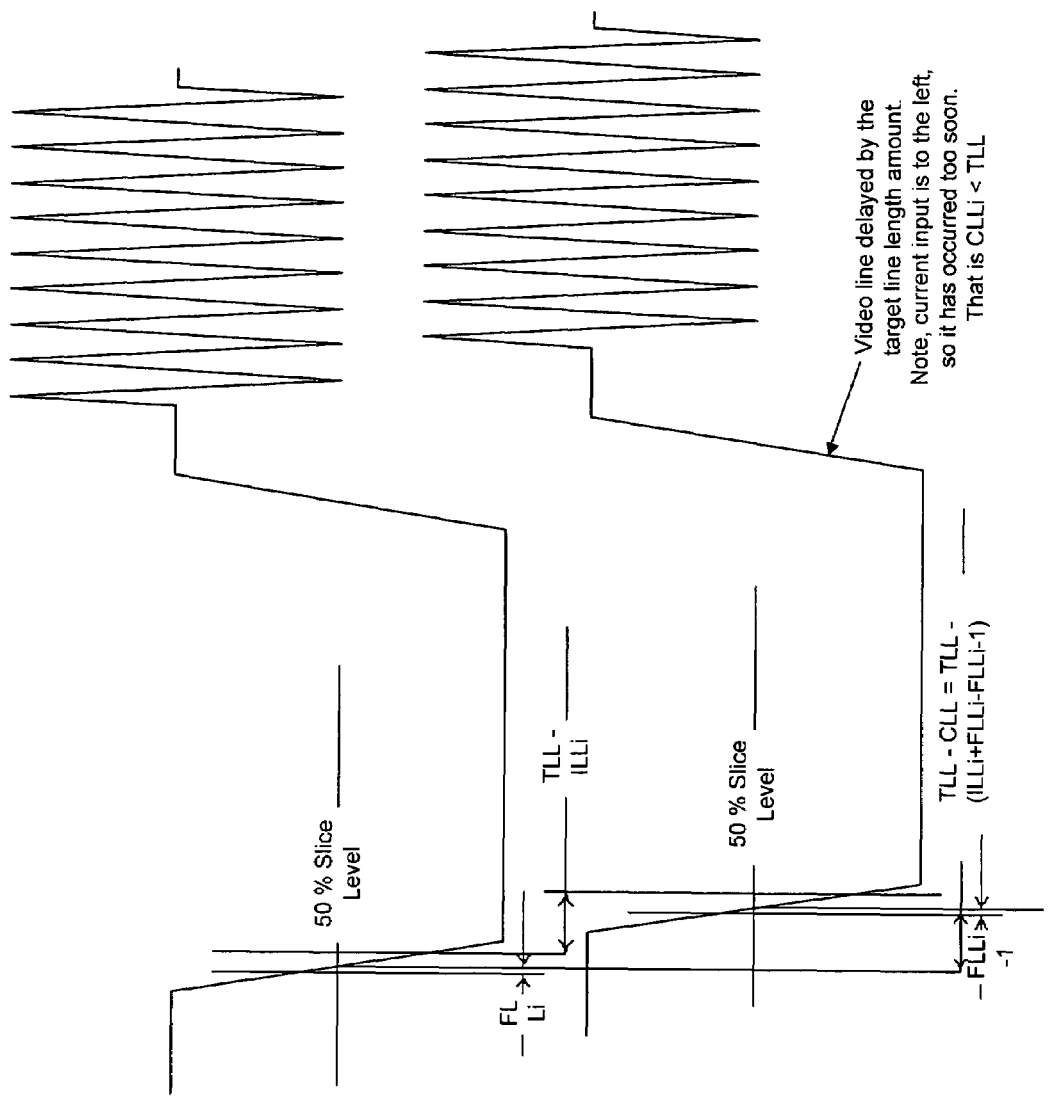
FIG. 1B illustrates the relationship between a current horizontal synchronization signal and a desired start timing for a new line for use in a TBC embodiment of the present invention.

The time base filter block 201 filters a line length for an input signal. In the present embodiment, the time base filter block 201 has inputs including an integer line length (ILLi) signal and a fractional line length (FLLi) signal as represented in FIGS. 1A and 1B. Referring to FIGS. 1A, 1B, and 2, the ILLi signal represents the number of pixels or clock cycles between two successive horizontal synchronization (hsync) signals. The FLLi signal represents the distance between an hsync signal and the actual beginning of the next output line. The $FLL_i$ is fractional because it represents a fraction of a pixel.

The time base filter block 201 additionally receives as inputs an output start of active value and an hsync signal. The output start of active value designates the beginning of active video for the output video. Typically you use the beginning of active video for the output video as the synchronization point in order to minimize the impact of any errors in the process during active video while maximizing the amount of variation in line lengths that can be corrected without adding additional storage.

The time base filter block 201 outputs a scaling increment 210 and initial phase 212 calculations to accumulator 202. In an embodiment, the scaling increment 210 is calculated by dividing an adjusted input line length (ALL) by an output line length (OLL) or ALL/OLL, as discussed below. To calculate ALL, the filter 201 adds ILLi to a start adjustment ($SADJ_i$) at the end of the line, and then subtracts a start adjustment ($SADJ_{i-1}$) at the beginning of the line. To determine $SADJ_i$, the filter 201 subtracts a phase error ($PE_i$) value from a line length correction ($LLC_i$) value, and then subtracts the resulting difference from the $FLL_i$ value, where $PE_i$ signifies the difference between Current Line Length (CLL) and Target Line Length (TLL). The time base filter block calculates initial phase by adding the time base corrector start adjustment for the current line ($TBCSA_i$) with the product of the scaling increment (ALL/OLL) and the desired output pixel number, as discussed in detail in the equations below.

The scaler control 202 provides a delay so the time base correction algorithm can accommodate large negative values of $TBCSA_i$ while still subject to the constraint of updating the scaling algorithm after the current HSYNC. The accumulator 202 achieves this delay by accumulating the scaling increment (ALL/OLL) for the number clock cycles equal to the output active start position and then adding to this result the start adjustment ($TBCSA_i$). The integer portion of the resulting sum is then the input pixel that occurs just before the output pixel at the start of active video. The fractional portion of the result represents the initial scaling phase that is used to produce the first output active pixel.

The scaler control (accumulator) 202 additionally receives hsync, an input pixel count, and an enable signal CEin. Accumulator 202 generates an output enable signal CEout to the horizontal scaler 203 and the output pixel counter 204. Other embodiments may use feedback from the output of the output pixel counter 204 as an input to the accumulator 202, or may additionally output the CEout signal from the accumulator 202 to a post processing block 205 In an embodiment, CEout occurs at the average rate of OLL/ALL times the input pixel rate of Cein. The design of the time base filter block 201, however, does not necessarily depend on the design of the horizontal scaler 203 or the scaler control 202. The horizontal scaler 203 and the scaler control 202, however, impact image quality. The designs of the horizontal scaler 203 and scaler control 202 are well known to those of skill in the art and will not be discussed in any further detail.

In an embodiment, the horizontal scaler is a polyphase filter or interpolation algorithm. Under that assumption, the integer portion of the TBCSA may represent the pixel (the number of CEin's relative to the most recent hsync signal) that is just greater in value than sync slice level of the leading edge of the hsync. The fractional portion may represent the fractional position between that pixel and the next pixel that best represents the actual position of the sync slice level of the leading edge of hsync.

The scaling increment may represent the number of input pixels for every output pixel. So if the filter 201 accumulates the scaling increment and adds it to the TBCSA value, then the integer portion would represent the input pixel that is spatially located just before the current output pixel and the fractional portion would represent the actual position of the output pixel relative to that input pixel. (For example, if you were using a linear interpolation algorithm you would multiply the current input pixel by one minus the fractional portion and add it to the next input pixel multiplied by the fractional value.)

The horizontal scaler 203 mimics a consumer television making frequency adjustments by adjusting a horizontal scaling ratio, for example like a PLL. The horizontal scaler 203 receives a YUV signal, a clock, and a CEin signal, in addition to the CEout signal from the accumulator 202. The horizontal scaler outputs the YUV signal and the clock. The Cein may represent the input pixel rate when the clock frequency is not equal to the input pixel rate. The scaler control 202 (or accumulator) generates CEout responsive to CEin. In one embodiment, the integer portion of the accumulator 202 minus one represents the number of CEin signals to drop to generate the CEout signal. The fractional portion of the accumulator 202 represents the polyphase filter or interpolation phase.

In some embodiments a post-processing block 205 may further process the signals after time base correction and horizontal scaling. For example, the post-processing block 205 may provide a low jitter clock signal capable of driving a display. The post-processing block 205 may receive the YUV and clock signals from the horizontal scaler 203 and the CEout signal from the accumulator 202. This embodiment may further receive the output from the output pixel counter 204.

For the above embodiments, the time base correction circuit 200 converts a sampled video signal, asynchronous with respect to the horizontal sync pulses, to one with a constant number of vertically aligned samples per line. We define constant here as sufficiently consistent to allow a stable video image. This allows sampling the input signal without locking the clock to the horizontal syncs. However, this may require the use of a FIFO before display or other post decoder functions.

The present example includes measuring the horizontal sync of the input signal before applying the time base correction and scaling, filtering noise from the measurements, and controlling a horizontal scaling algorithm with the result. Therefore, an embodiment of the present invention does not require scaling of the horizontal synchronization information and the construction of a feedback loop. And the correction can take place over several lines depending on filter implementation. Finally, the scaler control is flexible, for example, not determined by the state of a FIFO buffer that constrains time base correction.

Additionally, other embodiments may provide a TBC method compatible with deinterlacers and scalers, and allow many types of filters for the horizontal synchronization/line length information. These methods imply no use of feedback for synchronizing the time base corrector to the incoming video or for eliminating rounding errors.

Referring now to FIG. 1A and FIG. 1B, the drawings illustrate time base correction in accordance with the present invention. FIG. 1A displays a video line from an hsync signal through the active region and past a subsequent hsync signal. FIG. 1B shows a close up of timing measurements in the hsync portion of a video line, as explained in more detail below. The following explanation and mathematical derivations refer to FIGS. 1A and 1B.

In the drawing, an example circuit mimics consumer TV's in a method similar to a PLL, particularly where a difference between a current line length (CLL) and a target line length (TLL) determines frequency. For illustration purposes this difference is called phase error (PE), as shown in equation (1).

$$PE = CLL - TLL \tag{1}$$

To reduce the phase error to zero, the method or apparatus may consider a previous line length correction (LLC). An additional consideration is accumulation of uncorrected phase error. Therefore, phase error is the phase error calculated above, plus the previous phase error, minus any corrections.

$$PE_i = CLL_i - TLL + PE_{i-1} - LLC_{i-1} \tag{2}$$

Note, if the line length correction equals the measured phase error, then the result is simply equation (1). In addition, if the current line length is not on average equal to the target line length, then the average phase error will be non-zero. We will consider non-zero phase errors in more detail later.

The present example filters the horizontal synchronization measurements, or line lengths, to reduce noise in the video. Since the phase error equals the current line length minus a constant, filtering phase error is similar to filtering line lengths. Considering equation (2), if the line length correction is a function of the phase errors, any type filter can be implemented. For example, to implement a typical PLL infinite impulse response (IIR) low-pass filter, the following relationship holds:

$$PE_i = G*k*(CLL_i - TLL) + (1-k)*PE_{i-1} (k<1, G*k=1 \& G=DC \text{ gain}) \tag{3}$$

or, $$PE_i = CLL_i - TLL + PE_{i-1} - k*PE_{i-1} \tag{4}$$

By implication, $LLC_{i-1}$ equals $k*PE_{i-1}$.

To implement a finite impulse response (FIR) filter, $LLC_{i-1}$ should be equal to some function of $CLL_i$ and $PE_{i-1}$.

If we set $LLC_i = PE_{i-1} + f\{CLL_{i-1}, CLL_{i-2}, \ldots\}$ then:

$$PE_i = CLL_i - TLL - (-PE_{i-1} + PE_{i-1} + f\{CLL_{i-1}, CLL_{i-2}, \ldots\})$$

$$PE_i = CLL_i - TLL - f\{CLL_{i-1}, CLL_{i-2}, \ldots\}$$

$$PE_i = (CLL_i - TLL) - f\{CLL_{i-1}, CLL_{i-2}, \ldots\}$$

This allows a TBC based on a finite number of previous measurements. Note, to determine $PE_i$ based on n previous lines may require n+1 measurements in order to cancel out the $PE_{i-1}$ term on the right hand side.

The present example implements a TBC in hardware by transforming the above relationship to one based on the current horizontal synchronization position. Therefore bounding of the line length filter results in bounding of the TBC, reducing rounding and truncation errors. One embodiment implements the TBC with typical horizontal scaling methods by calculating the scaler's starting phase and scaling ratio. For illustration, assume a one line delay through the decoder, such as for a decoder with a 2 or 3 line comb filter.

Furthermore, the example uses the current horizontal synchronization to calculate the starting position for the next line. Next, the embodiment transforms the equation so the previous line starts relative to the current horizontal sync. The first adjustment is to add a fractional line length (FLL), since this represents the sub-pixel position of the horizontal sync for a given sync slice level. After that, the embodiment should subtract any accumulated phase errors less any line length adjustments, including that from the current horizontal synchronization measurement. This embodiment subtracts phase error because it represents unexpected line length surplus, and moves the start position closer to an expected start for the current line.

$$SADJ_i = FLL_i - (PE_i - LLC_i) \tag{5}$$

To determine start adjustment for the previous line, due to the one line delay, one embodiment adds to equation 5 the difference between the current synchronization and the target line length, or $TLL - ILL_i$. This results in, $$TBCSA_{i-1} = TLL - ILL_i + SADJ_{i-1} \tag{6}$$

Now, if PE=LLC, put differently, correction of all errors over one line, then FIG. 1B shows the relationship between the current horizontal synchronization and a desired start timing for the new line.

Note, with no delay through the video path, $TLL - ILLi = 0$. In general, the offset can be expressed as the sum of the $(TLL - ILL_i)$'s between the current synchronization and the synchronization that represents the start of the output line. This represents how much earlier the current horizontal synchronization is relative to expected, based on the horizontal synchronization at the beginning of the line about to be scaled.

$$TBCSA_{i-1} = \Sigma_0^n (TLL - ILL_{i-n}) + SADJ_{i-1} \tag{7}$$

Now the adjusted input line length (ALL) is simply the integer line length plus the start adjustment at the end of the line, minus the start adjustment at the beginning of the line.

$$ALL_i = ILL_i + SADJ_i - SADJ_{i-1} \tag{8}$$

The present example implements a TBC with equation 8. The $SADJ_i$ value can control the starting phase of a horizontal scaler. Additionally, the $ALL_i$ along with the required number of output samples generate the appropriate scaling factor to remove the TBC errors. Note if PE=LCC, then ALL becomes the following $$ALL_i = ILL_i + FLL_i - FLL_{i-1}. \quad (9)$$

Equation (9) is correct for the case of no filtering on the line lengths.

The remaining issue is when the average of the current line lengths is not equal to the total line length with filtering. Specifically, unless $LLC_{i-1}=PE_i$, a DC-offset problem is likely, the DC offset problem is effectively an undesirable output phase error similar to what can happen in a PLL. Note, it is possible to set $LLC_{i-1}=PE_i$ because $PE_i$ is known before the start of correction on the previous line if there is a one line delay in the decoder. For the case of a simple IIR filter such as the one used in equation (3), the magnitude of the DC phase error is equal to 1/k. This implies a DC error several times the actual line length error that without compensation, shifts the image. This is especially true for VTR trick modes.

To eliminate DC phase errors caused by frequency errors, an embodiment implements a low pass filter on phase errors and treats them like start adjustments. This has the advantage of not impacting the stability of the IIR low-pass filter that mimics the TV PLL. This is illustrated as phase adjustment ($PADJ_i$).

$$PADJ_i = k(PE_i - PADJ_{i-1}) + PADJ_{i-1} \quad (10)$$

Equation (10) leads to the following equations.

$$TBCSA_i = TLL - ILL_i + SADJ_i + PADJ_i \quad (11)$$

$$ALL_{i-1} = ILL_i + SADJ_i - SADJ_{i-1} + PADJ_i - PADJ_{i-1} \quad (12)$$

In the embodiment shown in FIG. 2, the TBC filter 201, implements the above equations, but converts the adjusted input line length (ALL) to a scaling increment by dividing it by the output line length:

Scaling Increment=ALL/OLL

The initial phase is simply the $TBCSA_i$ above in equation 11, plus the product of the scaling increment and the desired output pixel number for updating the scaler controller 202. An embodiment uses the beginning of active video from the output pixel counter 204 for the output video as the synchronization point, in order to minimize the impact of any errors during active video.

The scaling control block uses an accumulator loaded with the fractional portion of the initial phase when the input pixel number equals the integer portion of the initial phase. This represents the state of the accumulator if it started accumulating at the horizontal synchronization instead of at the start of the output active video. By delaying the update of the accumulator after the horizontal synchronization, the algorithm can handle larger negative values for $TBCSA_i$. Otherwise, it may have to start the scaling process for the next line before actually receiving the synchronization used for the timing above.

To keep truncation errors from causing too many output samples between updates to the scaler control, no additional CE's are allowed once the correct number of CE's have been produced. Otherwise, it could be possible to produce too many output samples per line when truncation errors cause to small a scaling increment. To insure other truncation errors do not cause an overly large scaling increment and therefore a shortage of output pixels, this embodiment subtracts a small number from the final scaling increment for later use in the accumulator.

The actual horizontal scaler 203 can implement any number of interpolation algorithms. The lack of feedback allows the type of interpolation to not impact the control logic.

Finally, the system assumes a downstream mechanism 205 to transition from the qualified clock signal system to a low jitter clock signal capable of driving a display. An embodiment provides a FIFO where the output clock adjusts to keep the FIFO approximately half full. Another exemplary embodiment provides a scan conversion block where the field memory also serves as a FIFO.

Figure 3:
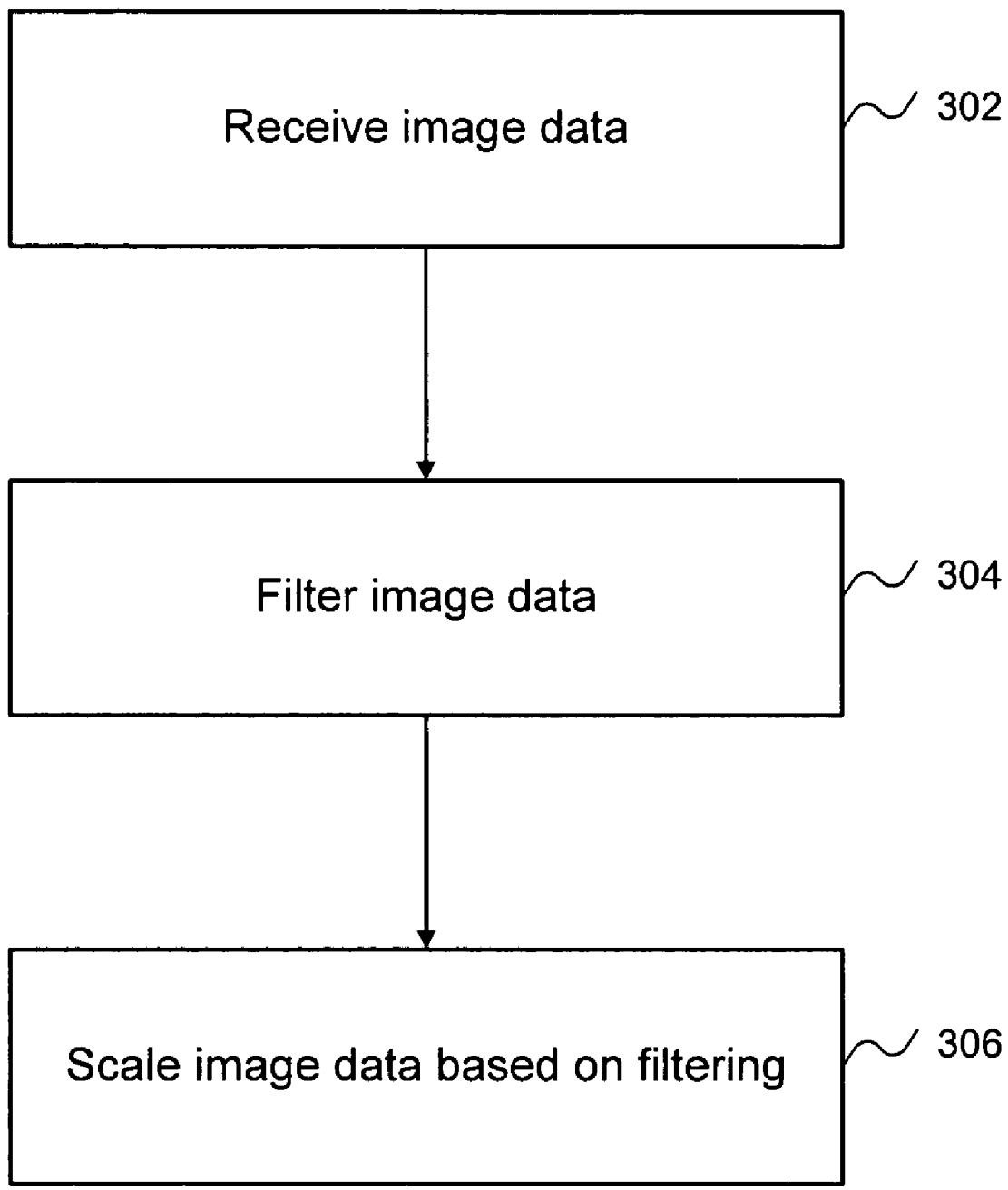
FIG. 3 is a flow diagram of a method for scaling of a video signal to provide TBC.

FIG. 3 is a flow diagram of a method of horizontally synchronizing an input signal to provide time base correction. The input signal is received at box 302. One embodiment provides receiving the input signal before time base correction and before scaling of the input signal. Features of the received input signal are then measured or filtered in box 304. The measurements may be based on changes in levels of the horizontal synch signal, the color burst, the active signal, or any other portion of a video signal that can usefully provide features that can be used in timing or scaling calculations. In block 306, the signal is then scaled according to at least some of the measurements from block 304. One embodiment uses the measurements from block 304 in an algorithm to provide a time base corrector. In the present embodiment, the output of block 306 is a constant number of vertically aligned samples per line.

Although the invention has been described with reference to certain specific embodiments, various modifications thereof will be apparent to those skilled in the art without departing from the spirit and scope of the invention as outlined in the claims appended hereto.

We claim:

1. A circuit comprising:
   a scaler; and
   a time base filter connected with the scaler, the time base filter to convert a video signal to a constant number of vertically aligned samples per line, to use a current horizontal synchronization signal to calculate a starting position for a prior line and to operate as an adaptive filter;
   where the time base filter samples a video signal without locking to a horizontal synchronization signal.

2. The circuit of claim 1 where the time base filter includes a finite impulse response filter.

3. The circuit of claim 1 where the time base filter includes an infinite impulse response filter.

4. A circuit comprising:
   a scaler; and
   a time base filter connected with the scaler, the time base filter to convert a video signal to a constant number of vertically aligned samples per line;
   where the time base filter filters line lengths to reduce noise in a video signal;
   where the time base filter filters line lengths as a function of a phase error; and
   where the phase error includes a difference between a current line length and a target line length.

5. A circuit comprising:
   a scaler; and
   a time base filter connected with the scaler, the time base filter to convert a video signal to a constant number of vertically aligned samples per line;
   where the time base filter includes a low pass filter to filter a phase error; and
   where the phase error includes a difference between a current line length and a target line length.

6. A method comprising:
   determining a line length for an input signal; and
   filtering the input signal responsive to the determination;
   where the filtering the input signal is a function of a phase error; and
   where the phase error includes a difference between a current line length and a target line length.

7. The method of claim 6 where determining a line length includes:
   determining an integer line length; and
   determining a fractional line length.

8. The method of claim 7 where filtering the input signal line includes filtering the input signal responsive to the determination of the integer and fractional line lengths.

9. The method of claim 6 where the filtering the input signal occurs responsive to a horizontal synchronization signal.

10. The method of claim 6 where the filtering the input signal occurs responsive to an output start of active value.

11. A method of operating a time-base correction circuit comprising:
    determining a line length for an input signal;
    using a current horizontal synchronization signal to calculate a starting position for a prior line;
    sampling the input signal without locking to a horizontal synchronization signal;
    filtering the input signal responsive to the determination; and
    scaling the filtered input signal.

12. The method of claim 11 where determining a line length includes:
    determining an integer line length; and
    determining a fractional line length.

13. The method of claim 11 where filtering the input signal line includes filtering the input signal responsive to the determination of the integer and fractional line lengths.

14. The method of claim 11 where the filtering the input signal occurs responsive to an output start of active value.

15. A method of operating a time-base correction circuit, comprising:
    determining a line length for an input signal;
    sampling the input signal without locking to a horizontal synchronization signal;
    filtering line lengths to reduce noise in the input signal responsive to the determination by filtering the line lengths as a function of phase error where the phase error includes a difference between a current line length and a target line length; and
    scaling the filtered input signal.

16. The method of claim 15 where determining a line length includes:
    determining an integer line length; and
    determining a fractional line length;
    where filtering the input signal line includes filtering the input signal responsive to the determination of the integer and fractional line lengths.

17. The method of claim 15 where the filtering the input signal occurs responsive to a horizontal synchronization signal.

18. The method of claim 17 where the filtering the input signal occurs responsive to an output start of active signal.

19. A time base correction circuit, comprising:
    a filter to filter image data responsive to a horizontal synchronization signal; and
    a scaler to scale the digital image data responsive to the filter;
    where the filter samples the image data without locking to a horizontal synchronization signal.

20. The time base correction circuit of claim 19 where the filter measures line lengths of the image data.

21. The circuit of claim 19 where the filter calculates a starting position for a next line responsive to the horizontal synchronization signal.

22. The time base correction circuit of claim 21 where the filter measures line lengths of the image data.

23. The time base correction circuit of claim 21 where the filter is a low pass filter to filter a phase error.

24. The time base correction circuit of claim 21 where the filter is a finite impulse response filter.

25. The time base correction circuit of claim 21 where the filter is an adaptive filter.

26. The time base correction circuit of claim 19 where the filter is a low pass filter to filter a phase error.

27. The circuit of claim 19 where the filter is an infinite impulse response filter.

28. The time base correction circuit of claim 19 where the filter is a finite impulse response filter.

29. The time base correction circuit of claim 19 where the filter is an adaptive filter.

\* \* \* \* \*